Nov. 5, 1968     A. K. O. A. REUTER     3,409,215
CONTINUOUS CENTRIFUGE
Filed June 20, 1966     3 Sheets-Sheet 1
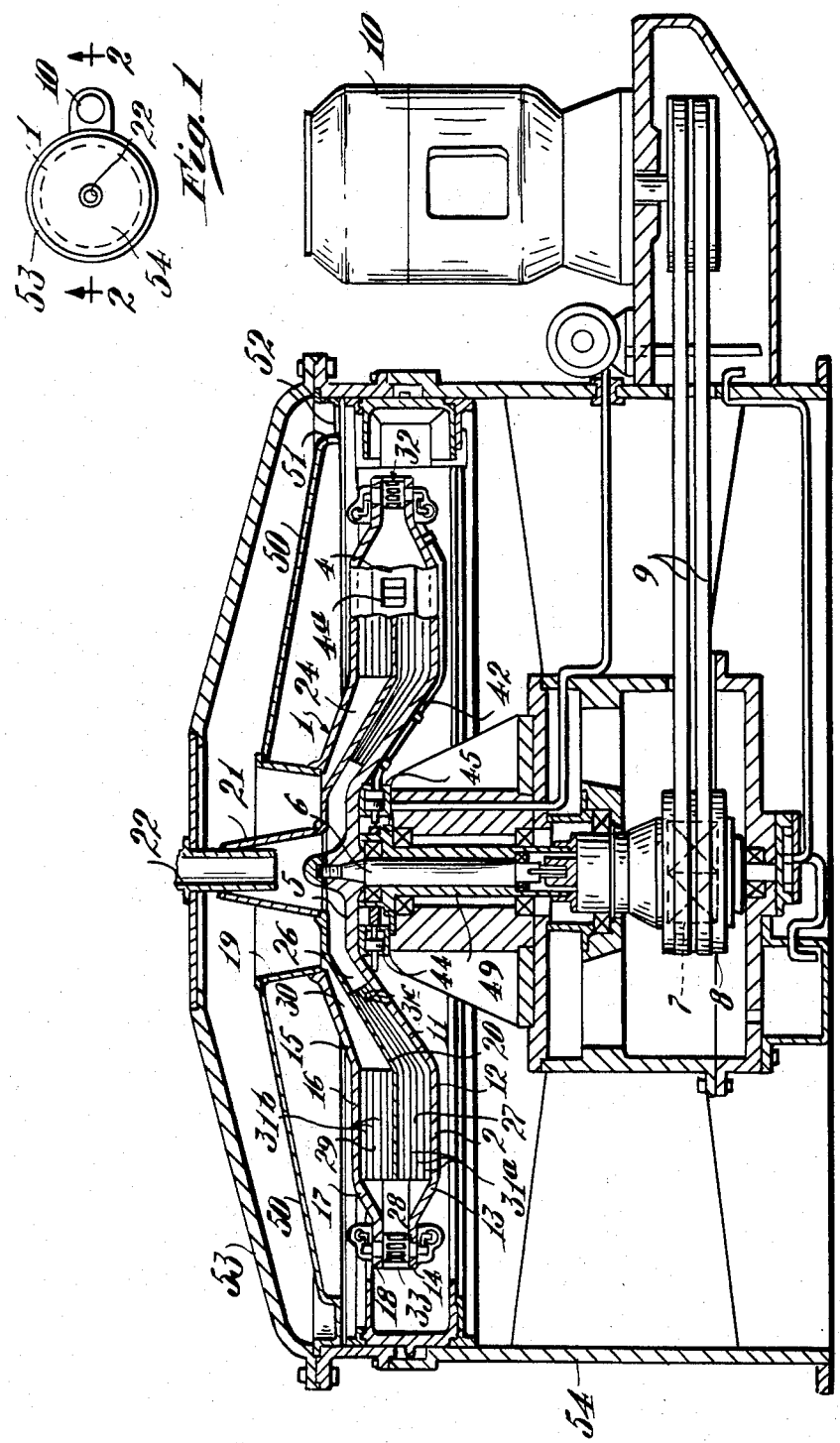

United States Patent Office 3,409,215
Patented Nov. 5, 1968

3,409,215
CONTINUOUS CENTRIFUGE
Adolf K. O. A. Reuter, Marburg an der Lahn, Germany, assignor to Beloit Corporation, Jones Division, Beloit, Wis., a corporation of Wisconsin
Filed June 20, 1966, Ser. No. 558,809
14 Claims. (Cl. 233—20)

ABSTRACT OF THE DISCLOSURE

A continuous centrifuge for separating solids and liquid of close specific gravities in a biological sludge has a dish-shaped rotating unit in which are formed a plurality of pairs of upper and lower passages. Each pair of passages forms a passage from a fluid inlet extending outwardly through the lower passage to a solid settling space, thence inwardly through the upper passage to a fluid outlet. Solids are allowed to settle and accumulate centrifugally, then are discharged at a controlled rate from the settling space by an hydraulically actuated gating bucket wheel. Turbulence is avoided by longitudinal walls in the passages which promote laminar flow and settling of the solids.

In the operation of some biological clarifying plants, sedimentary sludge materials of the waste water are obtained in the mechanical preliminary purification, and in a biological phase excess sludge is produced by the growth of bacteria. Both types of sludge are generally subjected jointly to an anaerobic putrefaction process and subsequently dehydrated on drying beds. These methods can only be used where the putrefying capability of the sludge is not impaired by industrial admixtures and where large surface areas are available for the natural dehydration and storage of the sludge. While mechanical dehydration of the preliminary sedimentation sludge is possible in most cases with conventional dehydrating devices like vacuum filters, pressure filters or centrifuges with a sufficient degree of dehydration and efficiency, biological overflow sludge can only be dehydrated by using relatively large quantities of chemicals or structure-forming substances. Their procurement, preparation and addition is rather expensive, however, and also they substantially impair the combustion properties of the sludges.

Sedimentary materials are separated from water only if they show a distinct difference in their specific gravity with regard to water. Because of the water-binding capacity of the activated sludge flakes (biological overflow sludge consists of such flakes), it is possible to measure only the volumetric weight of the flakes, not their specific gravity. This volumetric weight is about 1.1 g./cm.$^3$ with an attainable end water content of the discharge of 80 percent. Thus, because of the small difference in the specific gravity alone, a dehydration of activated sludge by centrifuging is rather difficult.

The object of the invention is to provide a centrifuge which permits continuous, mechanical dehydration of biological overflow sludge.

According to the present invention a continuously operating centrifuge for clarifying a slurry or sludge-like fluid, such as biological sludge, containing both solid bodies and liquid of closely equivalent specific gravities, comprises rotatable chamber-forming means forming a plurality of pairs of upper and lower passages extending outwardly from and rotatable about a central axis, each said upper and lower passage of a pair commuincating at their outer ends with each other and a solid-settling space, a fluid inlet feeding into the inner end of each lower passage, a fluid outlet at the inner end of each passage, and means at the outer end of each said settling space for discharging separated solids from said space at a controlled rate, whereby the settling of said solids from said fluid in each said space from both said passages is promoted by the centrifugal force.

For the purpose of illustration a typical embodiment of the invention is shown in the accompanying drawings, in which—

FIG. 1 is a plan view of a centrifuge with rotatable chamber-forming means;

FIG. 2 is an enlarged section on line 2—2 of FIG. 1;

Figure 3:
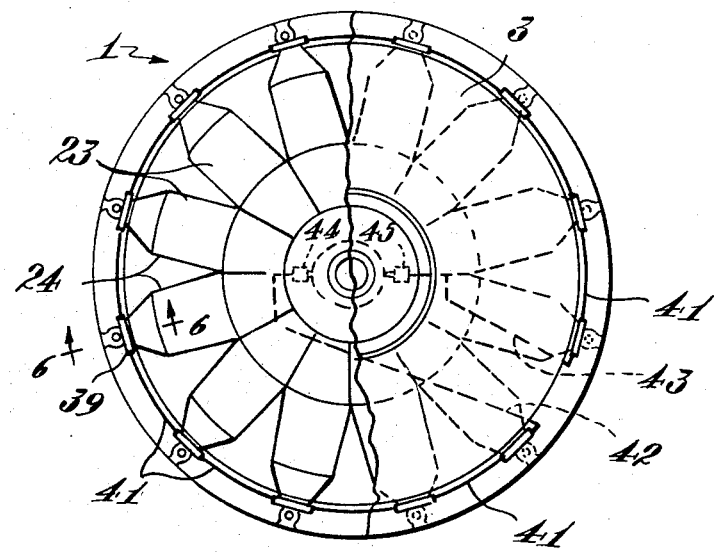
FIG. 3 is a plan view of the rotatable chamber-forming means.

As shown in FIGS. 1 to 3, the centrifuge has a dish-shaped unit 1 enclosing a series of radial chambers 23 (as illustrated there are twelve, but there may be more or less), the unit 1 being rotatably supported within a sealed casing 54 having a cover 53. The chamber-forming unit 1 is a casing consisting substantially of a lower rotating plate 2 and cover 3, which are connected with each other along their inner circumference by a circumferential wall 4. The plate 2 consists of a circular portion 5, which is secured on the drive shaft 6 of the centrifuge. The shaft 6 forms a part of a conventional differential gear 7, which is driven by a motor 10 through a V-belt pulley 8 and V-belts 9.

The differential gear also drives a quill 49 surrounding the shaft 6. The gears may be changed to vary the relative speeds of the shaft 6 and quill 49. Adjoining the circular portion 5 the lower rotating plate comprises a truncated cone 11 and merging into a ring-shaped part 12 which extends to a conical part 13 with an adjoining horizontal flange 14. The cover 3 is designed like the base 2, the parts corresponding to the part 11 to 14 being designated 15 to 18. Instead of the circular portion 5, the cover has an opening with a funnel-shaped outlet 19. The space between the lower rotating plate 2 and the cover 3 is subdivided into upper and lower spaces by an intermediate plate 20 shaped like the cone 11 and horizontal parts 12 of the lower rotating plate 2. This plate is secured on a journal of the above-mentioned drive shaft 6, that is, it runs with the rotor. It carries in its central opening a conical pipe 21 into which opens a stationary feed pipe 22. The liquid to be centrifuged entering the pipe 22 arrives in the pipe 21 and flows from here through the central opening in the intermediate plate 20 into the space between the bottom 2 and the intermediate plate 20.

As can be seen from FIG. 3, the spaces between the bottom plate 2 and the cover 3 are vertically partitioned into a number of compartments 23 by walls 24 extending perpendicularly to the bottom and generally radially from the central drive shaft 6. These partitions have such a form that, starting from the space above the circular base portion 5 and from the funnel 19 respectively, they form upper and lower passages having outwardly widening portions 26 and 30, adjoining portions 27 and 29 of substantially uniform cross section and with parallel side walls, and an outer truncated pyramid end portion 28. The portions of the passages are traversed by the liquid to be centrifuged in the order 26 to 30. The passages 27, 28 and 29 form the separating and settling region proper. In each passage portion 27 are arranged several parallel baffle plates 31a which extend across the compartment parallel to the bottom and to the cover respectively. Similar parallel baffle plates 31b are disposed transversely of each upper uniform cross section passage portion 29. The plates 31a are continuous with outwardly diverging baffle plates 31c in the outwardly widening passage portions 26.

Figure 4:
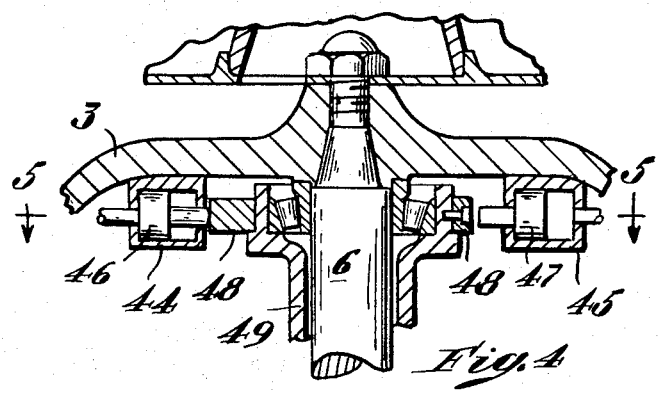
FIG. 4 is an enlarged detail of FIG. 2.
Figure 5:
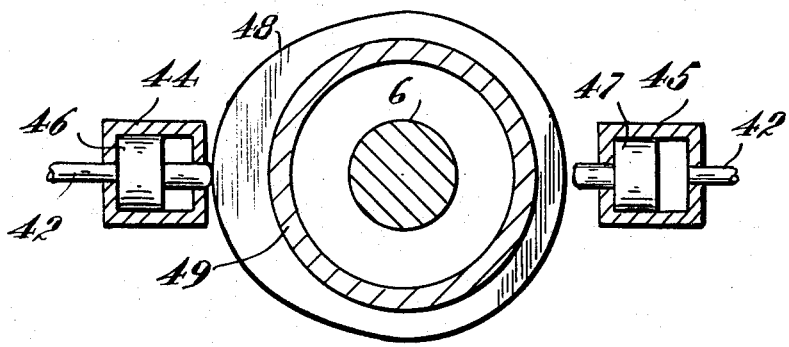
FIG. 5 is a section on line 5—5 of FIG. 4.
Figure 6:
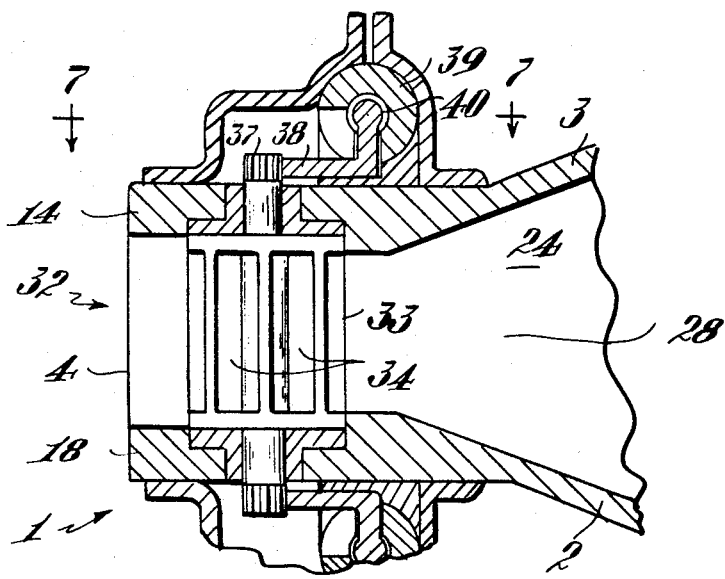
FIG. 6 is a vertical section on line 6—6 of FIG. 3.
Figure 7:
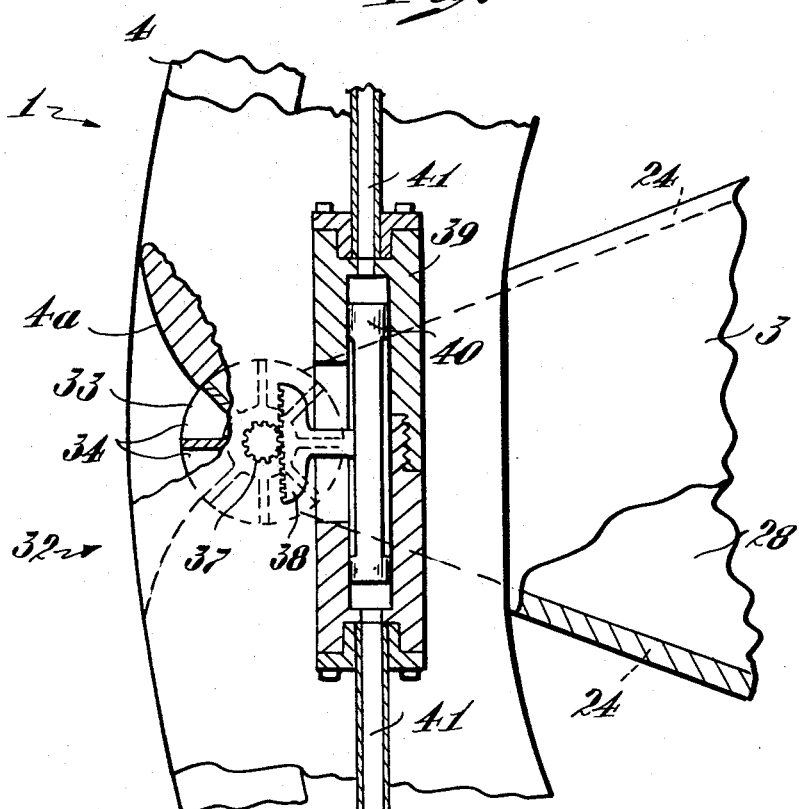
FIG. 7 is a section on line 7—7 of FIG. 6.

Each outer end 28 of the passages has a discharge device 32, which is represented in FIGS. 6 and 7 on an enlarged scale. It consists of a bucket wheel 33 which is journalled in the flanges 14 and 18 to rotate in a gate opening 4a in the circumferential wall 4. The bucket wheel has peripherally spaced recesses 34 which are alternately exposed to the end passage portion 28 of the exterior of each centrifuge chamber as the bucket wheels are rotated through approximately 180°. Each bucket wheel journal carries a gear wheel 37 driven by a rack 38. The rack is hydraulically driven by a piston 40 in a cylinder 39, the piston being rigidly connected with the above-mentioned rack 38. Each cylinder 39 is connected at each end by a pipe 41 to the cylinder of an adjacent bucket wheel. The pipes 41 and the cylinders 39 form a pipe line whose ends are connected in FIG. 3 by more or less radial lines 42, 43 with cylinders 44, 45 which are represented in FIGS. 4 and 5 on an enlarged scale. The pipe lines are filled with a fluid pressure-medium.

In cylinders 44 and 45 respectively are pistons 46 and 47, which are driven alternately by a cam 48. This cam is fixed on the quill 49 which is driven by the above-mentioned differential gear 7 at variably different speeds with respect to the speed of the centrifuge element 1 driven by the shaft 6. The cylinders 44, 45 are secured on the underside of the bottom 2 of the element 1, as shown in FIG. 2, that is, they rotate with the element. If the quill 49 were to rotate with the same speed as the shaft 6, the pistons 46, 47 would maintain their position. But the above-mentioned parts rotate with a somewhat different speed, so that the pistons 46, 47 are alternately displaced and thus drive the pistons 40 in the cylinders 39 at the same time so that the bucket wheels turn alternately in one or the other direction and discharge settled sludge solids from the outer passage portion 28 at a controlled rate.

The method of operation of the centrifuge is as follows. The sludge to be clarified is fed through the pipe 22 to the conic portion 26 of the lower passage. In the conic portion the velocity of flow of the sludge decreases at a constant gradual rate with laminar flow along the baffle plates 31c which inhibit turbulence and breaking-up of sludge flakes. The sludge passes then through the constant cross section portion 27 with the parallel side walls which are subdivided by the baffle plates 31b. Here it has a lower constant velocity so that a more nearly laminar flow is formed. This constant velocity is maintained at the flow reversing point in the outer end portion 28 of the upper and lower passages, and in the upper passage portion 29. Its velocity increases gradually in the portion 30, until it arrives in the outlet 19. From the outlet it flows over the upper edge of this outlet on a plate 50 which forms a truncated cone with a trough 51. At at least one point of the circumference of the trough is an outlet 52 which leads to a discharge pipe (not represented). The plate 50, as well as the cover 53 are arranged on the centrifuge housing 54.

The compartments 27, 28, and 29 of each partial chamber 23 form the separating region in which the sludge particles are separated by the centrifugal force. Separation of the solids progresses through lower passage portions 26 and 27, with the sludge settling in end portion 28. Separation continues in the upper passage portion 29, the solids being centrifuged back into the end 28. The separated solids accumulate in the chambers of the bucket wheels and are repeatedly discharged by them. The radially issuing sludge accumulates under the centrifuge in a collecting device (not represented).

It should be understood that the foregoing description is for the purpose of illustration only, and that this invention includes all modifications and equivalents falling within the scope of the appended claims.

I claim:

1. A continuously operating centrifuge for clarifying a slurry or sludge-like fluid, such as biological sludge, containing both solid bodies and liquid of closely equivalent specific gravities, comprising rotatable chamber-forming means forming a plurality of circumferentially spaced pairs of upper and lower passages extending outwardly from and rotatable about a central axis, each said upper and lower passage of a pair communicating at their outer ends with each other and a solid-settling space to form a confined path for said liquid extending outwardly through the lower passage, thence through the settling space and inwardly through the upper passage so that all fluid must flow through said settling space, a fluid inlet feeding into the inner end of each lower passage, a fluid outlet at the inner end of each upper passage, and means at the outer end of each said settling space for discharging separated solids from said space at a controlled rate allowing the solids to settle and accumulate before discharge, whereby substantially only solids are discharged and whereby the settling of said solids from said fluid in each said space from both said passages is promoted by the centrifugal force.

2. A centrifuge according to claim 1 wherein each said lower passage has an inward portion increasing in cross-section outwardly of the passage to cause a gradual decrease in fluid flow velocity between said inlet and the outward portion of the lower passage.

3. A centrifuge according to claim 2 wherein each said inward portion is divided by longitudinal walls affording non-turbulent laminar flow of the fluid.

4. A centrifuge according to claim 1 wherein each said lower passage has an outward portion of uniform cross-section between the inner and outer ends of the lower passage producing constant fluid flow velocity.

5. A centrifuge according to claim 4 wherein said uniform cross-section portion is divided by longitudinal plates permitting non-turbulent laminar flow of the fluid thereby to separate the solids from the liquid progressively toward the outer end of the lower passage without breaking up the solid bodies.

6. A centrifuge according to claim 1 wherein said upper passage has a portion of uniform cross-section extending inwardly of the upper passage from said settling space to allow further progressive separation of the solids from the liquid back toward said settling space by centrifugal force.

7. A centrifuge according to claim 6 wherein said upper passage portion has longitudinal dividing plates providing non-turbulent laminar flow of the fluid.

8. A centrifuge according to claim 1 wherein each said discharging means comprising gating means located outwardly of and communicating with said settling space, hydraulically actuated means for operating said gating means, a first rotor driving said rotatable chamber forming means, a second rotor, means to drive said first and second rotors at different speeds, and cam means operatively associated with said first and second rotors and actuated at a rate dependent on the difference in speed between said rotors, said cam means operating said fluid actuated means.

9. A centrifuge according to claim 8 wherein said rotor drive means includes means for adjusting the relative speeds of said rotors.

10. A centrifuge according to claim 8 wherein each said discharging means comprises a gate opening outwardly of said settling space, a drum rotatable in said gate, said drum being rotatably connected to said hydraulically actuated means, said drum having peripherally spaced recesses alternately exposed to the settling space and the exterior as the drum is rotated by said hydraulically actuated means.

11. A centrifuge according to claim 8 wherein said cam means comprises a cam on one of said rotor means and a fluid pump on the other of said rotors reciprocally actuated by said cam.

12. A centrifuge according to claim 8 wherein said hydraulically actuated means are disposed around the periphery of said rotor means in a hydraulic series in which said actuated means are interconnected by circumferential hydraulic conduits, the beginning and end of said series being connected to said cam means.

13. A centrifuge according to claim 12 wherein each said hydraulically actuated means comprises a cylinder and a piston reciprocating therein, the cylinders being connected in said hydraulic series, and said cam means imparting a double action to said pistons.

14. A centrifuge according to claim 13 wherein each said piston is connected to rotatable gating means by a rack and gear.

References Cited

UNITED STATES PATENTS

| | | | |
|---|---|---|---|
| 2,200,302 | 5/1940 | Harvey | 233—20 |
| 2,291,117 | 7/1942 | Strezynski | 233—28 XR |
| 2,483,342 | 9/1949 | Henrard | 233—29 |
| 2,495,950 | 1/1950 | Van Der Werff | 233—28 XR |
| 2,538,529 | 1/1951 | Komline | 233—20 |
| 3,117,928 | 1/1964 | Thylefors | 233—29 XR |
| 3,341,094 | 9/1967 | Putterlik | 233—29 |

FOREIGN PATENTS

| | | |
|---|---|---|
| 64,151 | 9/1949 | Netherlands. |

HENRY T. KLINKSIEK, *Primary Examiner.*